May 26, 1936.  H. M. STOLLER  2,041,875

MULTIPLE SPEED MOTOR

Filed Aug. 8, 1934

INVENTOR
H. M. STOLLER
BY Wayne B Wells
ATTORNEY

Patented May 26, 1936

2,041,875

UNITED STATES PATENT OFFICE 2,041,875

MULTIPLE SPEED MOTOR

Hugh M. Stoller, Mountain Lakes, N. J., assignor to Bell Telephone Laboratories, Incorporated, New York, N. Y., a corporation of New York Application August 8, 1934, Serial No. 738,944

8 Claims. (Cl. 172—278)

This invention relates to multiple speed motors and particularly to synchronous motors that may be operated at a number of speeds.

One object of the invention is to provide an alternating current synchronous motor free from salient poles that shall operate at a number of synchronous speeds.

Another object of the invention is to provide a hysteresis synchronous motor having a number of stator windings that shall operate at a number of synchronous speeds.

Another object of the invention is to provide a hysteresis synchronous motor having a number of stator windings producing different numbers of poles and a cylindrical shell rotor operating at substantially maximum permeability that shall rotate at a number of synchronous speeds upon selective energization of the stator windings.

A further object of the invention is to provide a hysteresis synchronous motor having a stator carrying two windings mounted in the same stator slots and adapted to produce different numbers of poles when energized and a cylindrical shell composed of magnetic material and operating at substantially maximum permeability that shall rotate at a number of synchronous speeds upon selective energization of the stator windings.

In many instances it is desirable to rotate devices at a multiple number of constant speeds. It is necessary to operate phonographs at two different speeds by reason of the existing phonograph records being designed for operation at 78 revolutions per minute and at 33⅓ revolutions per minute. According to the present invention a hysteresis synchronous motor is provided which may be operated at a multiple number of synchronous speeds from a constant frequency source of alternating current. A hysteresis motor if provided with a rotor made of magnetic material will operate synchronously with the frequency of the supplied alternating current.

A hysteresis motor provided with a rotor of magnetic steel and supplied with constant frequency alternating current will operate as a synchronous motor and at constant speed.

Let $V=$ volume of steel of the rotor,
$\beta=$ magnetic density, and
$\eta=$ coefficient of hysteresis.

The energy expended by hysteresis in the rotor is per cycle.

$$W_0 = V\eta\beta^{1.6},$$

hence, if $f=$ frequency, the power supplied by the magnetomotive force to the rotating shell or disc in the hysteresis loop of the magnetomotive force is:

$$P_0 = fV\eta\beta^{1.6}$$

At the slip, $sf$, that is, the speed $(1-s)f$, the power expended by hysteresis in the rotating disc is, however:

$$P_1 = sfV\eta\beta^{1.6}$$

Hence, in the transfer from the stationary to the revolving member of the magnetic power:

$$P = P_0 - P_1 = (1-s)fV\eta\beta^{1.6}$$

has disappeared, and thus reappears as mechanical work, and the torque is:

$$D = \frac{P}{(1-s)f} = V\eta\beta^{1.6}$$

that is, independent of speed.

From the above equations, it is apparent that if the rotor of the hysteresis motor is made of magnetic material, it will rotate synchronously.

In designing a hysteresis motor for maximum torque it is obvious that $V\eta\beta^{1.6}$ should be a maximum. It has been found experimentally that this is approximately the case where the proportions of the steel path and the coercive force are such that when the motor is working with its normal armature current, the flux density in the steel is that its permeability is a maximum.

In one particular application it is found that with approximately 100 ampere turns per pole in the stator, that a coercive force of 70 oersteds and a rotor steel section ⅛ inch radial depth gives satisfactory operation. If the radial depth of the steel is changed the resultant change in $\beta$ is sufficient to reduce the value of the product $V\beta^{1.6}$.

In a multiple speed hysteresis motor constructed in accordance with the present invention, the motor is preferably formed of laminations of silicon steel having teeth for forming slots to carry a number of sets of windings. A number of sets of windings are mounted in the same stator slots to produce different numbers of poles. In the illustrated motor the stator is provided with twenty-eight teeth and a fourteen-pole two-phase winding and a six-pole two-phase winding are mounted in the slots formed by the teeth. When the motor is supplied with 60-cycle current the six-pole winding operates the rotor at 1200 revolutions per minute and the fourteen-pole winding operates the rotor at 514 revolutions per minute. The six-pole winding is placed at the bottom of the slots in the stator in order to obtain an optimum flux density in the rotor by either the six-pole winding or the fourteen-pole winding. The twenty-eight teeth on the stator provide two teeth per pole for the fourteen-pole winding and an average of four and two-thirds teeth per pole for the six-pole two-phase winding. The actual six-pole winding comprises four poles of five teeth and two poles of four teeth. The rotor is a cylindrical shell of magnetic material surrounding the stator and mounted in an aluminum cast hub attached to the motor shaft. The preferred material for forming the rotor is two to five per cent chromium steel.

The hysteresis type of motor, unlike other types of motors, has an optimum flux density at which maximum torque is obtained. In the illustrated motor, it was found desirable to use a rotor comprising a relatively thin cylindrical shell in order to obtain the optimum flux density with the magnetizing forces available from the fourteen-pole winding. The magnetizing forces available from the six-pole winding would normally be greater and, therefore, result in a higher than optimum flux density in the rotor. An optimum flux density in the rotor when using the six-pole winding was obtained by locating the six-pole winding at the bottom of the stator slots, thereby introducing additional leakage flux in this winding which reduced the effective resultant flux density in the rotor so that the optimum density was still obtained with either winding.

The phonograph structure and the connections to the motor are disclosed and claimed in the application of E. R. Morton Serial No. 743,179, filed September 8, 1934.

In the accompanying drawing Fig. 1 is a cross-sectional view of a motor constructed in accordance with the invention and a phonograph turntable connected to the motor;

Figure 1:
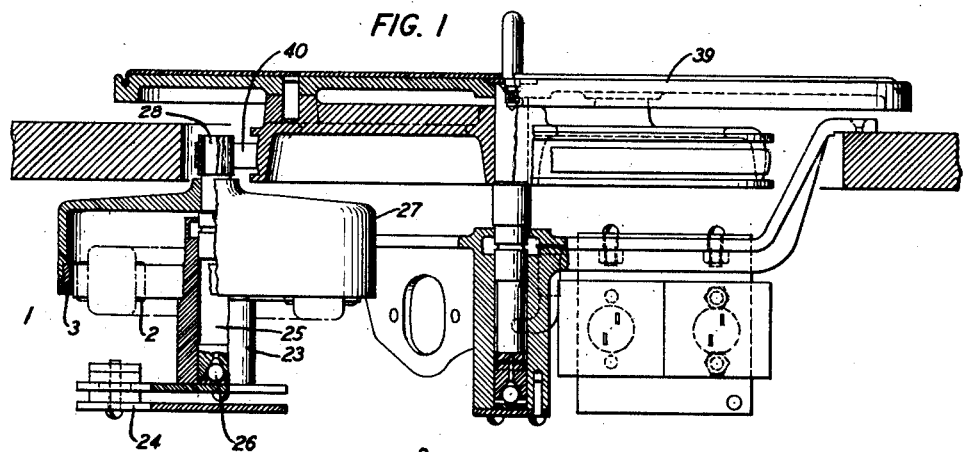
Figure 2:
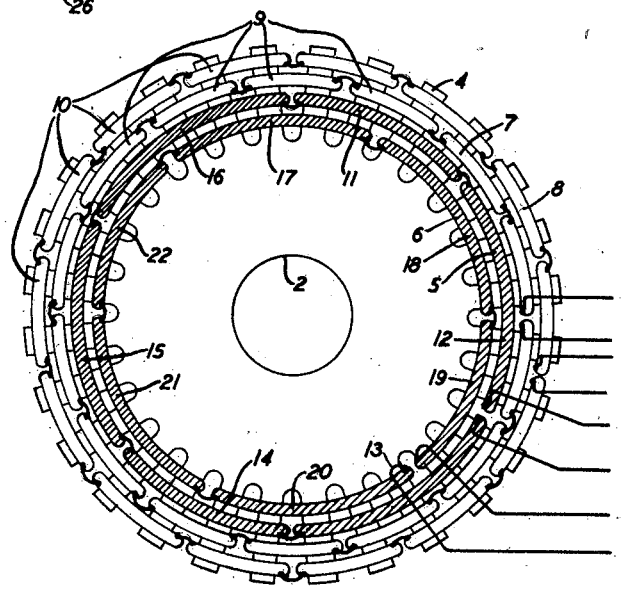
Fig. 2 is a plan view of the stator in the motor shown in Fig. 1.

Referring to the drawing and particularly Figs. 1 and 2, a motor 1 is shown comprising a stator 2 and a rotor 3. The stator 2 comprises laminations preferably of silicon steel and in the illustrated model has twenty-eight teeth 4 formed therein. A six-pole single phase winding 5, a six-pole single phase winding 6, a fourteen-pole single phase winding 7 and a fourteen-pole single phase winding 8 are mounted together in the slots formed by the teeth 4. The fourteen-pole windings 7 and 8 are mounted near the outside circumference of the stator 2 and the six-pole windings 5 and 6 are mounted at the bottom of the slots formed by the teeth 4 in order to obtain an optimum flux density in the rotor 3 when either the six-pole windings or the fourteen-pole windings are energized.

The coils 9 of the fourteen-pole winding 7 and the coils 10 of the fourteen-pole winding 8 are mounted with two teeth per coil as shown in Fig. 2 of the drawing. The six-pole windings 5 and 6 theoretically have an average of four and two-thirds teeth per pole. In practice, however, and as shown on the drawing it is necessary to provide four poles of the six-pole windings with five teeth and two poles of the six-pole windings with four teeth. Coils 11 and 14 of the six-pole single phase winding 5 are provided with four teeth per pole and coils 12, 13, 15 and 16 of the six-pole single phase winding 5 are provided with five teeth per pole. The coils 17, 18, 20 and 21 of the six-pole winding 6 are provided with five teeth, and the coils 19 and 22 in this winding are provided with four teeth.

The laminations of the stator 2 are supported on a hub 23 mounted on a suitable supporting member 24 as described in the above mentioned application of E. R. Morton, Serial No. 743,179.

A motor shaft 25 which is rotatably mounted within the hub 23 is supported on a suitable thrust bearing 26 carried on the support 24. A cup-shaped hub member 27, which is mounted on the shaft 25 above the stator 2, extends over and around the stator as shown in Fig. 1 of the drawing. The rotor 3 is mounted on the cup-shaped member 27 as shown in Fig. 1 of the drawing to rotate adjacent to the teeth 4 of the stator 2. The rotor 3 preferably comprises a cylindrical shell of magnetic material in order that the motor will operate as a hysteresis motor. A five per cent chrome steel rotor has been found to operate satisfactorily.

Figure 3:
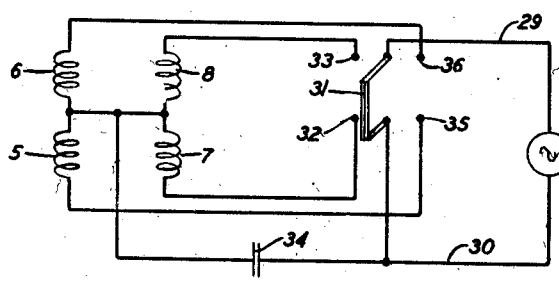
Fig. 3 is a diagrammatic view of the circuit connections to the rotor windings of the motor shown in Fig. 1.

The motor shown in the drawing is adapted to operate on single phase current and is provided with means to split the phase so as to effect operation as a two-phase motor. Referring to Fig. 3 of the drawing a single phase supply line comprising conductors 29 and 30 is shown connected to a two-pole double-throw switch 31. When the switch 31 is thrown towards the left as viewed in Fig. 3 of the drawing to engage contact members 32 and 33 the windings 7 and 8 of the fourteen-pole winding are connected to the supply conductors 29 and 30 and a condenser 34 is connected across the winding 7 to change the phase relation of the current in the winding 7 with respect to the current in the winding 8. When the switch 31 is thrown towards the right as viewed in Fig. 3 of the drawing, engagement is made with the contact members 35 and 36 for connecting the windings 5 and 6 of the six-pole winding to the supply conductors 29 and 30. At the same time the condenser 34 is connected across the winding 5 to change the phase relation of the current in this winding with respect to the current in the winding 6.

A driving pulley 28 which preferably is composed of soft rubber with a surface ground accurately concentric to the shaft 25 is connected to the driven pulley on the phonograph turntable 39 by means of an endless belt 40 as shown in Fig. 1 of the drawing. The detail connections of the motor to the phonograph turntable are disclosed in detail in the above mentioned application of E. R. Mort  Serial No. 743,179. A motor constructed as .bove set forth has been found to deliver 1.25 inch ounces of torque at 514 revolutions per minute and .75 inch ounces at 1200 revolutions per minute. This torque developed by the motor when reduced to turntable speeds corresponds to torques of 18.74 and 11.25 inch ounces. The corresponding starting torques are approximately 50 and 35 inch ounces.

Modifications in the structure and in the arrangement and location of parts can be made within the spirit and scope of the invention and such modifications are intended to be covered by the appended claims.

What is claimed is:

1. A slow speed motor adapted to operate at a plurality of synchronous speeds and comprising a stator having a slotted core and a plurality of windings wound for different numbers of poles, a rotor comprising a continuous, symmetrical ring of magnetic material, the windings being disposed in the stator slots at different depths and the thickness of the rotor magnetic material being such as to obtain optimum flux density in the rotor and maximum torque by the motor when either winding is energized, and electrical means for shifting the synchronous speed of said rotor at will by energizing any desired stator winding.

2. In a hysteresis synchronous motor for driving a phonograph at two speeds, a stator, a continuous, symmetrical, magnetic ring rotor, said stator comprising a slotted core having two windings thereon for different numbers of poles, said windings being disposed relatively to each other in the stator slots to obtain optimum flux density in the rotor by either winding, and means for changing the speed of said rotor by shifting from one stator winding to another.

3. In a hysteresis synchronous motor adapted to operate at two synchronous speeds, a stator and a continuous, symmetrical, magnetic ring rotor, said stator comprising a slotted core having two sets of windings thereon wound for different numbers of poles and adapted to drive the rotor at different synchronous speeds depending on which set of windings is energized, the set of windings for producing the lower number of poles being positioned in the stator slots farther away from the rotor surface than the winding for producing the higher number of poles in order to obtain an optimum flux density in the rotor by either of said sets of windings.

4. A hysteresis synchronous motor comprising a stator having a slotted core and two sets of windings wound for different numbers of poles placed in the same slots with the winding having the lesser number of poles placed deepest in the slots, said windings being wound to form six poles and fourteen poles with the teeth formed by said slots, a rotor member comprising a cylindrical ring of magnetic material proportioned to operate at substantially maximum permeability with each of said windings and positioned around said stator windings, a cup-shaped member of non-magnetic material for carrying said cylindrical ring, and means for selectively energizing said sets of windings to operate the motor at different synchronous speeds.

5. A hysteresis synchronous motor comprising a stator having a slotted core and two sets of windings wound for different numbers of poles to produce two synchronous speeds having a non-integral relation, a motor member comprising a cylindrical ring of magnetic material proportioned to operate at substantially maximum permeability with each of said windings and positioned around said stator windings, and a cup-shaped member of non-magnetic material for carrying said cylindrical ring.

6. A hysteresis synchronous motor comprising a stator having a core provided with twenty-eight teeth and two sets of windings wound to form six poles and fourteen poles with said teeth, a rotor member comprising a cylindrical ring of magnetic material proportioned to operate at substantially maximum permeability with each of said windings and positioned around said stator windings, a cup-shaped member of non-magnetic material for supporting said cylindrical ring, and means for selectively energizing said sets of windings to operate the motor at different speeds having a non-integral relation.

7. A two-speed hysteresis synchronous motor comprising a stator having a slotted core and two sets of windings wound for different numbers of poles, the poles of said windings having a non-integral relation to each other for producing synchronous speeds having a non-integral relation, a shaft rotatable on a vertical axis and having a thrust bearing, a cup-shaped member of aluminum mounted on said shaft and positioned adjacent to said stator, and a rotor member comprising a cylindrical ring of magnetic material proportioned to operate at substantially maximum permeability with each of said windings, positioned around said stator windings and mounted on said cup-shaped member.

8. A hysteresis synchronous motor comprising a stator having a slotted core and two sets of windings wound for different numbers of poles, a shaft extending through said stator core, rotatable on a vertical axis and having a thrust bearing, a cup-shaped member of aluminum fixedly mounted on said shaft and positioned adjacent to said stator, a rotor member comprising a cylindrical shell of from two to five per cent chromium steel, positioned around said stator windings and mounted on said cup-shaped member, the thickness of the rotor shell with respect to the position of the windings in the slots being made to obtain operation of the rotor at maximum permeability with each winding, and means for selectively energizing said sets of stator windings to to operate the motor at different synchronous speeds.

HUGH M. STOLLER.